(12) United States Patent
Comet et al.

(10) Patent No.: US 8,786,611 B1
(45) Date of Patent: Jul. 22, 2014

(54) SLIDING SKIN DEFORMER

(75) Inventors: Michael Comet, Concord, CA (US);
Philip Child, San Francisco, CA (US)

(73) Assignee: Pixar, Emeryville, CA (US)

( * ) Notice: Subject to any disclaimer, the term of this patent is extended or adjusted under 35 U.S.C. 154(b) by 665 days.

(21) Appl. No.: 13/005,113

(22) Filed: Jan. 12, 2011

(51) Int. Cl.
*G06T 13/00* (2011.01)
*G06T 15/00* (2011.01)
*G06K 9/00* (2006.01)

(52) U.S. Cl.
USPC ............ 345/473; 345/419; 345/474; 382/111

(58) Field of Classification Search
USPC ......... 345/419, 420–422, 423, 428, 473–475; 382/111, 154, 190
See application file for complete search history.

(56) References Cited

U.S. PATENT DOCUMENTS

| | | | | |
|---|---|---|---|---|
| 7,292,250 | B2 * | 11/2007 | Sepulveda | 345/473 |
| 2006/0023923 | A1 * | 2/2006 | Geng et al. | 382/116 |
| 2007/0132757 | A1 * | 6/2007 | Hassner et al. | 345/420 |
| 2008/0170078 | A1 * | 7/2008 | Sullivan et al. | 345/473 |

OTHER PUBLICATIONS

Johannes Saam, Jon Macey, Jian J. Zhang, Production Friendly Character Skinning, 2007, Proceedings of the 2007 International Conference on Cyberworlds CW '07, p. 129-135.*

Dmitriy Pinskiy, Sliding Deformation: Shape Preserving Per-Vertex Displacement, May 2010, Eurographics 2010, Norrköping, Sweden, p. 1-4, ISSN: 0167-7055.*

\* cited by examiner

*Primary Examiner* — Xiao Wu
*Assistant Examiner* — Michael J Cobb
(74) *Attorney, Agent, or Firm* — Kilpatrick Townsend & Stockton LLP

(57) ABSTRACT

This disclosure relates to methods and systems for generating deformers that allow nondynamic objects, such as representations of skin, to appear to slide on a target surface. Computer simulations can be inflexible when it comes to creative input and also introduces extra time into the production process. One or more controls (e.g., a slider or a dial) can be generated based on a weight map and a direction field of an irregular surface that allow the user to slide nondynamic objects, such as representations of skin, on the surface facilitating computer-generated animation.

19 Claims, 6 Drawing Sheets

SLIDING SKIN DEFORMER

BACKGROUND

This disclosure relates to computer-generated imagery (CGI) and computer-aided animation. More specifically, this disclosure relates to techniques for creating nondynamic sliding deformers for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

Accordingly, what is desired is to solve one or more of the problems relating to creating nondynamic sliding deformers for use in CGI and computer-aided animation, some of which may be discussed herein. Additionally, what is desired is to reduce some of the drawbacks relating to creating for creating nondynamic sliding deformers for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

This disclosure relates to computer-generated imagery (CGI) and computer-aided animation. More specifically, this disclosure relates to techniques for creating nondynamic sliding deformers for use in CGI and computer-aided animation.

In various embodiments, a method for facilitating computer-generated animation includes receiving information specifying an irregular mesh. The irregular mesh may include one or more subdivision surfaces. Information is also received specifying a weight map associated with the irregular mesh. The weight map may define movement of features of the irregular mesh or information associated with the irregular mesh. Information is also received specifying a direction field associated with the irregular mesh. The direction field may define one or more directions in which movement of the features of the irregular mesh or information associated with the irregular mesh occurs. A sliding deformer can then be generated for the irregular mesh based on the weight map and the direction field. The sliding deformer can be configured to constrain movement of the features of the irregular mesh or information associated with the irregular mesh along the shape of the irregular mesh.

In further embodiments, the sliding deformer may be manipulated by one or more users. In one aspect, information may be received specifying a value for the sliding deformer. A first location is further received or determined. A second location may be determined with the sliding deformer based on the input value for the sliding deformer and the first location. The second location when relative to the irregular mesh may be a geodesic distance along the irregular mesh from the first location when relative to the irregular mesh.

In some embodiments, information specifying a value for the sliding deformer and a first location are received. The first location may be queried for information defined on or near the first location. The information defined on or near the first location may then be transferred to a second location determined with the sliding deformer to be a geodesic distance along the irregular mesh from the first location based on the input value for the sliding deformer and the first location. The information defined on or near the first location comprises at least one of a vertex associated with the irregular mesh, an edge associated with the irregular mesh, a face associated with the irregular mesh, a color, animation data, simulation or dynamic properties, and render data.

In another aspect, direction fields may be defined based on axis or other structures. In one embodiment, the direction field may be generated based on one or more curves specified within an embedding space associated with the irregular mesh. In another embodiment, the direction field may be generated based on rotation about a predetermined axis. The direction field may be generated independently of any influence derived from the irregular mesh.

In one embodiment, a nontransitory computer-readable medium stores computer-executable code for facilitating computer-generated animation. The computer-readable medium may include code for receiving information specifying an irregular mesh, code for receiving information specifying a weight map, code for receiving information specifying a direction field, and code for generating a sliding deformer for the irregular mesh based on the weight map and the direction field, the sliding deformer being an animation control configured to constrain movement of each of a set of locations identified by the weight map along the irregular mesh relative to one or more directions identified by the direction field for a corresponding location.

In further embodiments, a nontransitory computer-readable medium stores computer-executable code for facilitating computer animation. The computer-readable medium may include code for determining a target location in a 3-dimensional embedding space associated with an irregular mesh in response to a traversal of the irregular mesh in a 2-dimensional embedding space from a source location in the 2-dimensional embedding space corresponding to a source location in the 3-dimensional embedding space based on information identifying at least one weight map, each weight map indicative of a different portion of the irregular mesh in either the 2-dimensional or 3-dimensional embedding space and specifying a movement amount in indicated embedding space for an indicated portion of the irregular mesh, and information identifying at least one direction field, each direction field associated with a different portion of the irregular mesh in either the 2-dimensional or 3-dimensional embedding space and indicative of one or more movement directions in the indicated embedding space for an associated portion of the irregular mesh; and code for transferring information associated with the source location in the 3-dimension embedding space to the target location in the 3-dimension embedding space A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

This disclosure relates to computer-generated imagery (CGI) and computer-aided animation. More specifically, this disclosure relates to techniques for creating nondynamic sliding deformers for use in CGI and computer-aided animation.

Figure 1:
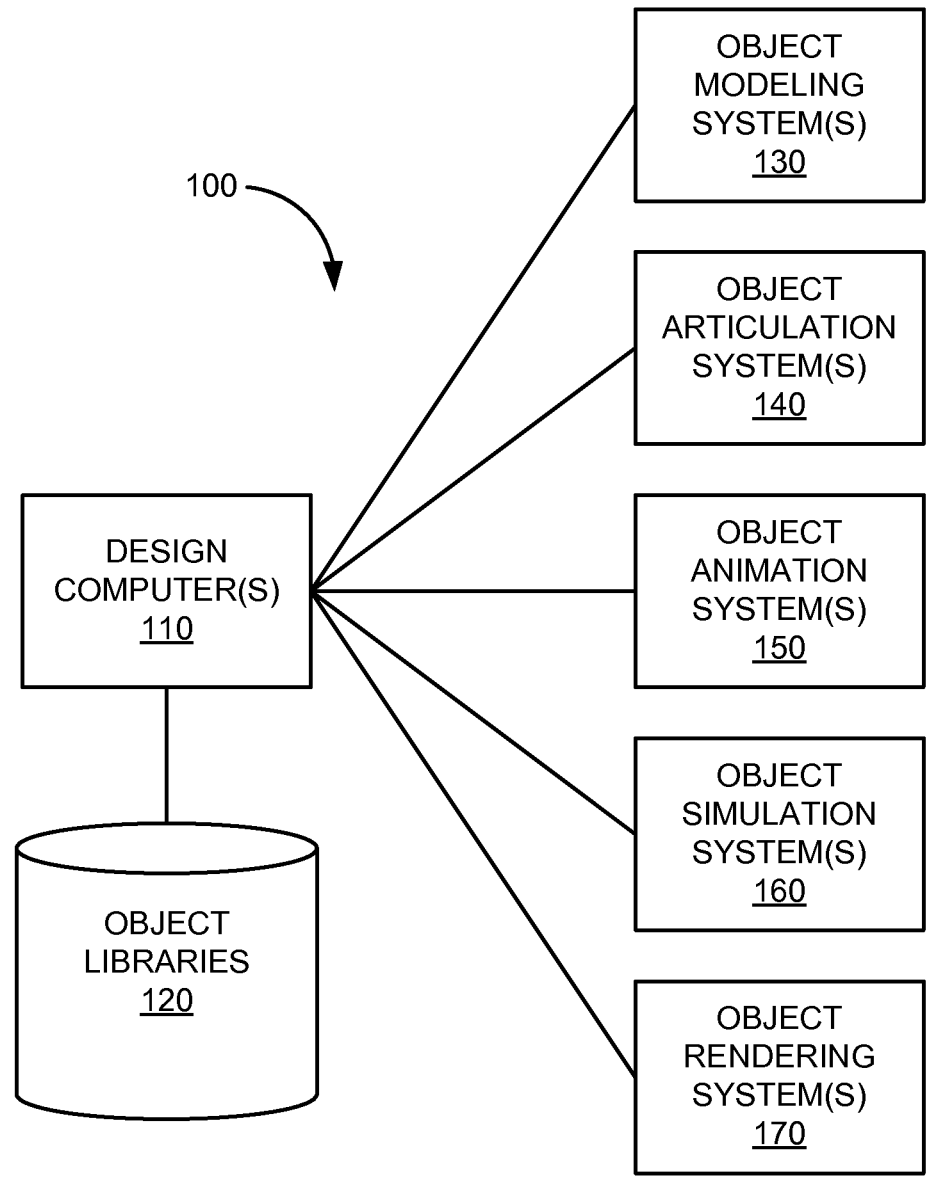
FIG. 1 is a simplified block diagram of a system for creating computer graphics imagery (CGI) and computer-aided animation that may implement or incorporate various embodiments or techniques for creating nondynamic sliding deformers.

FIG. 1 is a simplified block diagram of system 100 for creating computer graphics imagery (CGI) and computer-aided animation that may implement or incorporate various embodiments or techniques for creating nondynamic sliding deformers. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit/general purpose graphics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through nonclear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), nonphotorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

Sliding Skin Deformer

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for creating nondynamic sliding deformers.

In various embodiments, system 100 generates a deformer that allows nondynamic objects, such as representations of skin, to appear to slide on a target surface. Typically, a computer simulation decides how a dynamic representation of skin looks. However, the computer simulation is often inflexible when it comes to creative input and also introduces extra time into the production process as users await results of the simulation. Accordingly, in various embodiments, system 100 provides one or more controls (e.g., a slider or a dial) that allow the user to slide nondynamic objects, such as representations of skin, on a surface.

Figure 2:
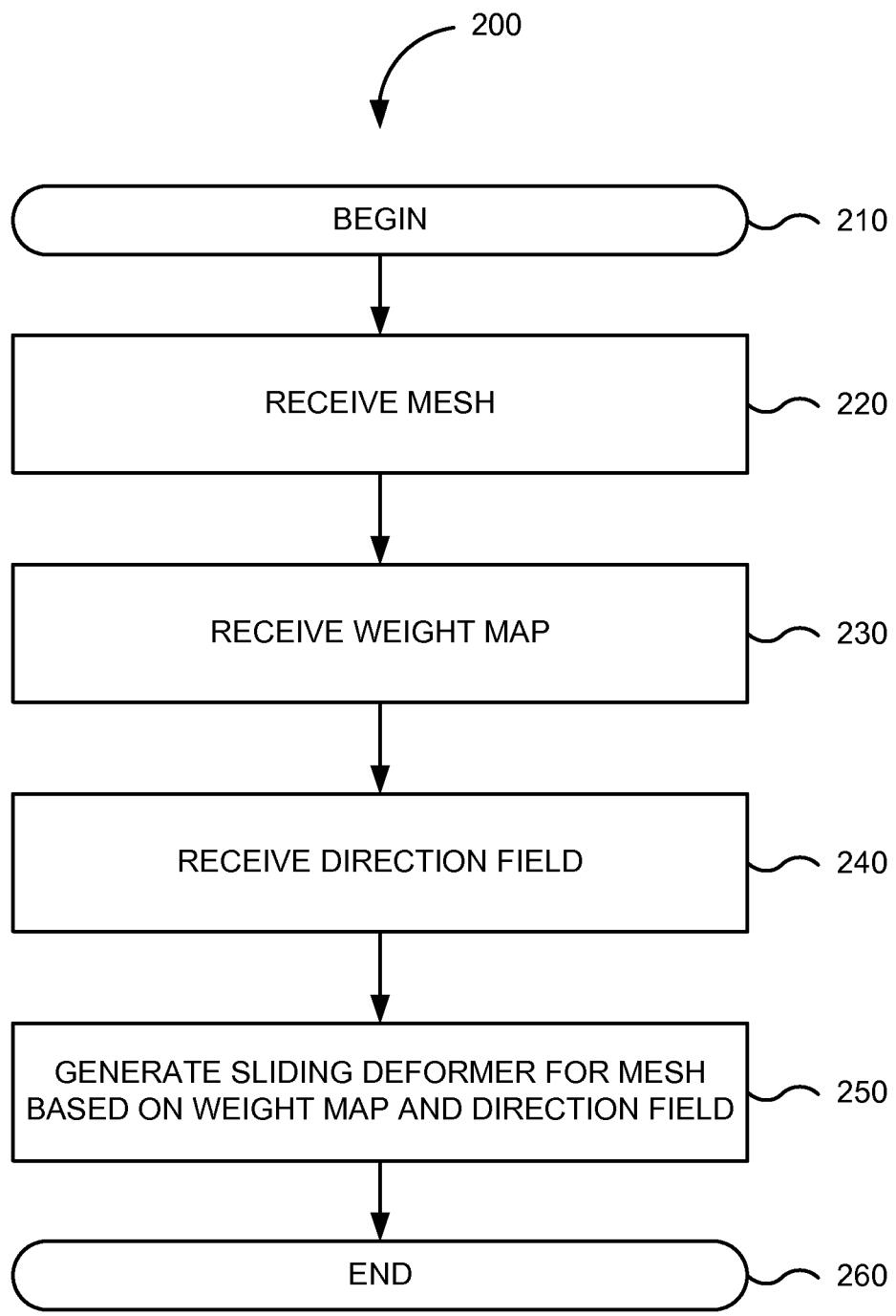
FIG. 2 is a simplified flowchart of a method for generating a sliding deformer in one embodiment.

FIG. 2 is a simplified flowchart of method 200 for generating a sliding deformer in one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a mesh is received. For example, system 100 may receive information defining an irregular mesh (e.g., together with its geometry and topology). Other types of meshes, such as subdivision meshes or other nonuniform meshes may be used. In various embodiments, system 100 may received other information associated with the mesh, such as added structures, simulation properties, animation data, render data or other lighting and shading properties, or the like.

In step 230, a weight map is received. A weigh map can include information specifying how features of the mesh (e.g., one or more points, vertices, edges, faces, polygons, etc. associated with the mesh) or information associated with the mesh (e.g., animation data, simulation data, render data) move. A value in the weight map for a location associated with the mesh may specify a scaling factor, speed at which the location moves relative to another factor, or the like. Weights may be manually defined or procedurally defined. In one example, a user may paint a set of weights onto one or more portions of an associated mesh.

In step 240, a direction field is received. A direction field can include information specifying one or more directions in which features of the mesh (e.g., one or more points, vertices, edges, faces, polygons, etc.) or information associated with the mesh (e.g., animation data, simulation data, render data) move. Direction may be manually defined or procedurally defined. Direction may also be defined relative to one or more coordinates systems and/or embedding spaces.

In various embodiments, one or more directions of the direction field can be user-guided. For example, a user may place and orient one or more directional references on or near the mesh. The direction field may then be generated considering the placement and orientation of each of these directional references. In some embodiments, a user may construct one or more curves from which the direction field is generated. In other embodiments, a user may specify an arbitrary axis of rotation. In other embodiments, the direction field may be inherited or influenced by a 2-dimensional parameterization of an irregular mesh, such as a UV map. The direction field may then be generated based on rotation about the predetermined axis. In further embodiments, the direction field is nontrivial in that the direction field is not associated with mesh data. The direction field may be generated independently of any influence of the mesh.

In step 250, a sliding deformer for the mesh is generated based on the weight map and the direction field. In one aspect, a sliding deformer may be generated to include one or more animation variables or animation controls that are configured to translate one or more input values into one or more deformations of the mesh using the weight map and the direction field. In another aspect, a sliding deformer may be generated to include one or more animation variables or animation controls that are configured to translate one or more input values into one or more deformations of another mesh using the mesh, the weight map, and the direction field. In yet another aspect, a sliding deformer may be generated to include one or more animation variables or animation controls that are configured to transfer information from one locatin to another location using the mesh, the weight map, and the direction field. A sliding deformer can be represented by one or more graphical widgets that include one or more inputs with which a user can specify input, such as a sliding amount.

In some embodiments, a sliding deformer may be generated and configured to look at a point on or near a surface of the mesh and perform a geodesic or topological walk of the mesh. The weight map may influence the sliding deformer in how far the geodesic or topological walk of the mesh is to occur. The direction field may dictate to the sliding deformer the direction at each step the geodesic or topological walk of the mesh is to take. The end result of the geodesic or topological walk of the mesh then can be applied pose the mesh, another mesh, or transfer information from one location to another. A geodesic solution can be determined based on the rest state of a mesh such that results of geodesic or topological walk are not affected by other poses and deformations of the mesh. FIG. 2 ends in step 260.

Figure 3:
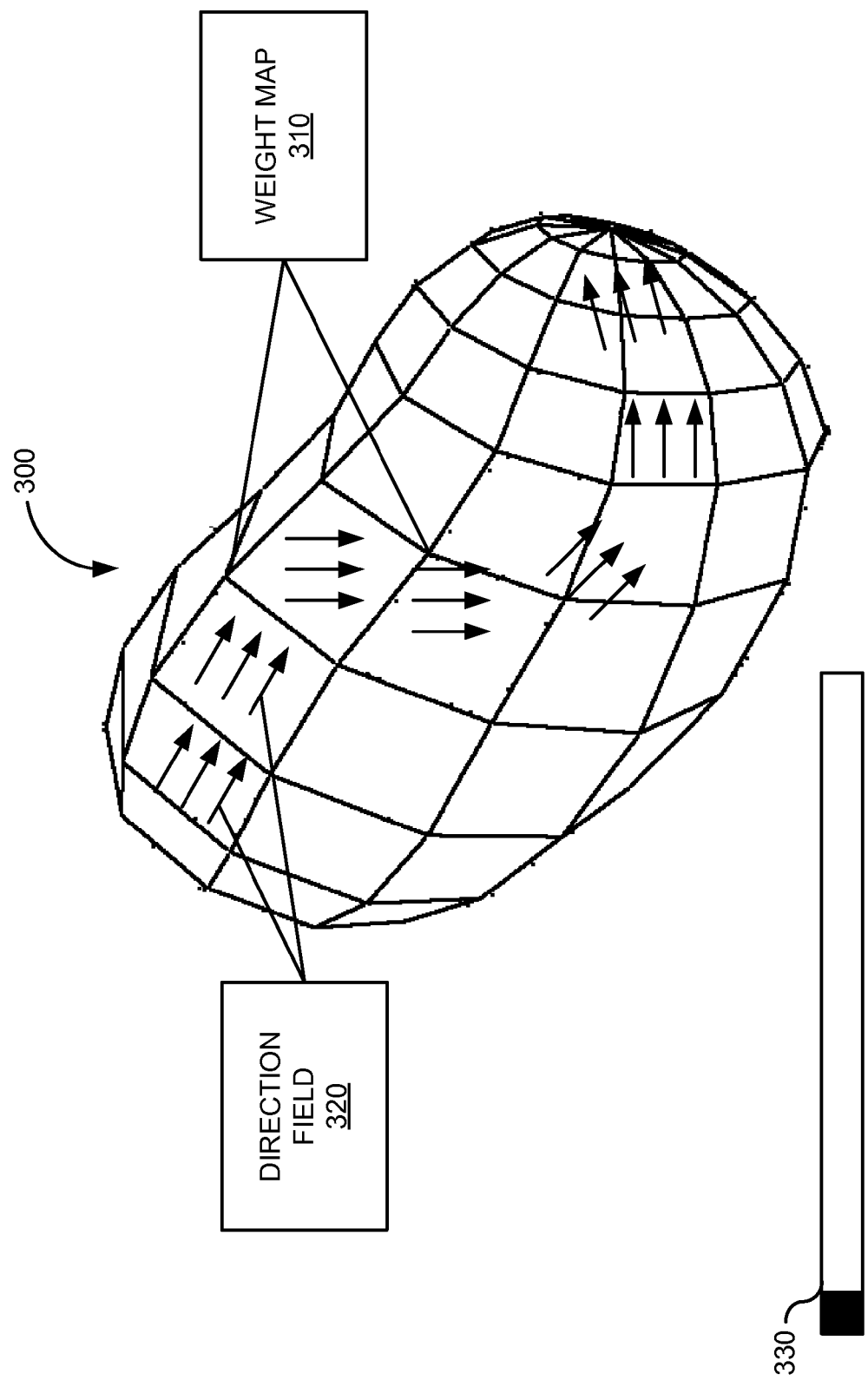
FIG. 3 is an illustration of an object on which is defined a weight map and direction field in one embodiment.

FIG. 3 is an illustration of object 300 on which is defined weight map 310 and direction field 320 in one embodiment. Slider 330 is a visual representation of an input mechanism to a sliding deformer configured to constrain motion of portions of object 300 or other information defined on or near object 300 relative to the rest shape of object 300. In this example, object 300 includes an irregular mesh forming a blob.

Weight map 310 includes information identifying which portions of object 300 are influenced by the sliding deformer. As discussed above, weight map 310 may identify specific features of object 300, such as vertices, edges, faces, etc. Weight map 310 may further define an amount that the features move. Direction field 320 includes information identifying one or more directions for the portions of object 300 that are influences by the sliding deformer. In this example, a series of arrows illustrate direction along the surface of object 300 for which movement is constrained. As discussed above, direction field 320 may identify one or more directions along which movement is constrained. Direction field 320 may be specified using directions along one or more axis or rotations along one or more pivots.

Figure 4:
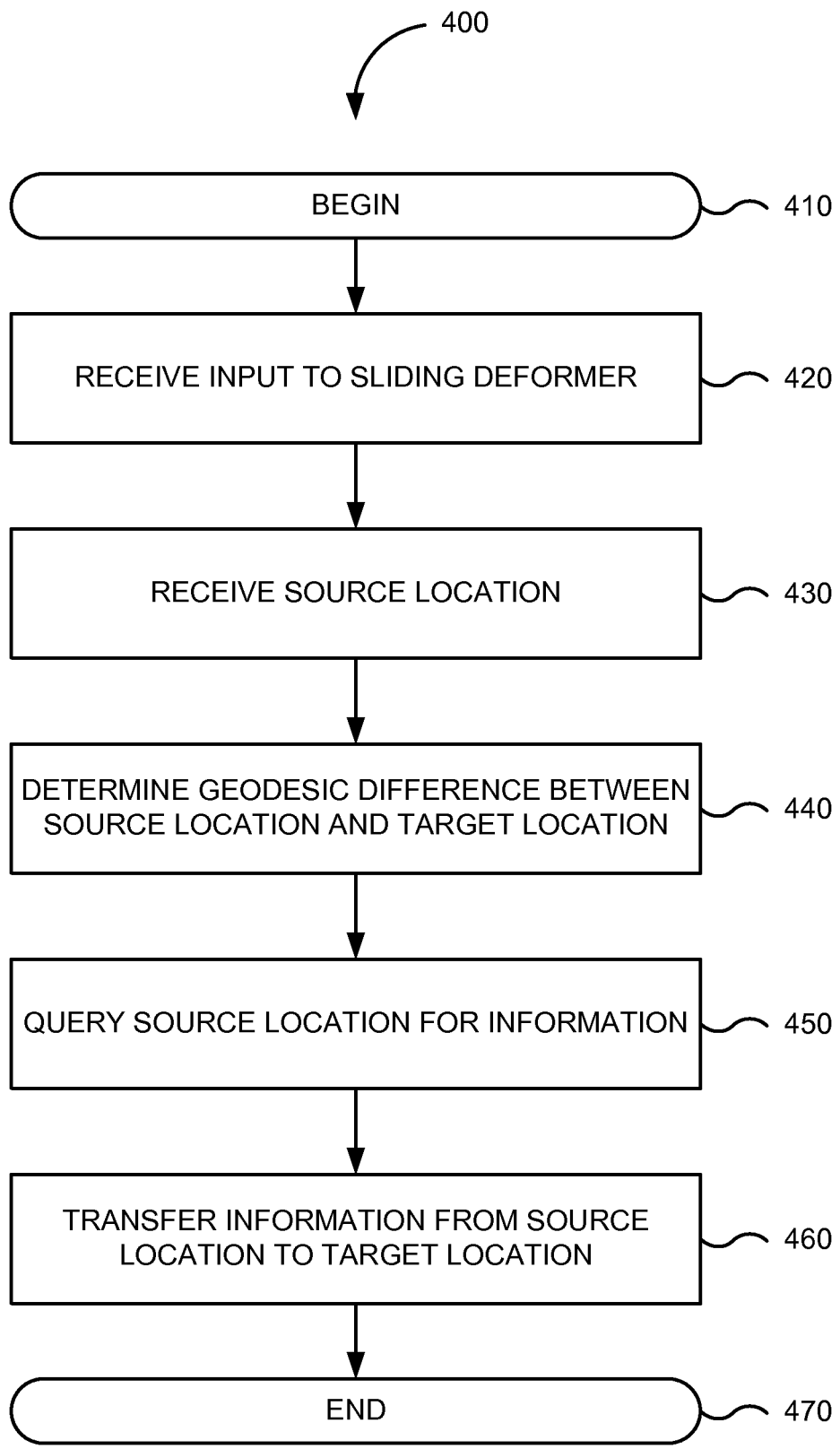
FIG. 4 is a flowchart of a method for transferring information using a sliding deformer in one embodiment.

FIG. 4 is a flowchart of method 400 for transferring information using a sliding deformer in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, input is received for a sliding deformer. The input may be driven in a variety of ways. For example, one or more visual controls or dials may be provided to a user that are configured to be manipulated by the user. In step 430, a source location is received. The source location may be provided by a user or automatically inferred from an object.

In step 440, a geodesic difference between the source location and a target location is determined. For example, the target location may be identified on object 300 based on a geodesic walk of the rest shape of object 300 starting at the source location and considering direction field 320. In various embodiments, a target location in a 3-dimensional embedding space associated with object 300 may be determined in response to a traversal of object 300 in a 2-dimensional embedding space from a source location in the 2-dimensional embedding space corresponding to a source location in the 3-dimensional embedding space. Weight map 310 may be indicative of a portion of the irregular mesh in either the 2-dimensional or 3-dimensional embedding space and specify a movement amount in the indicated embedding space for the portion of object 300. Direction field 320 may identify at least one direction field associated with the portion of object in either the 2-dimensional or 3-dimensional embedding space and one or more movement directions in the indicated embedding space.

In step 450, source location is queried for information. The queried information may indicate that the source location is a feature of object 300, such as a vertex, edge, face, etc. In another example, information defined on or near object 300 at the source location may be retrieved. In step 460, the queried information is transferred to the target location. Accordingly, movement of features of object 300 may be constrained along the rest shape of object 300. In other embodiments, information defined on or near the source location may be transfer along the rest shape of object 300 to a new target location. FIG. 4 ends in step 470.

Figure 5:
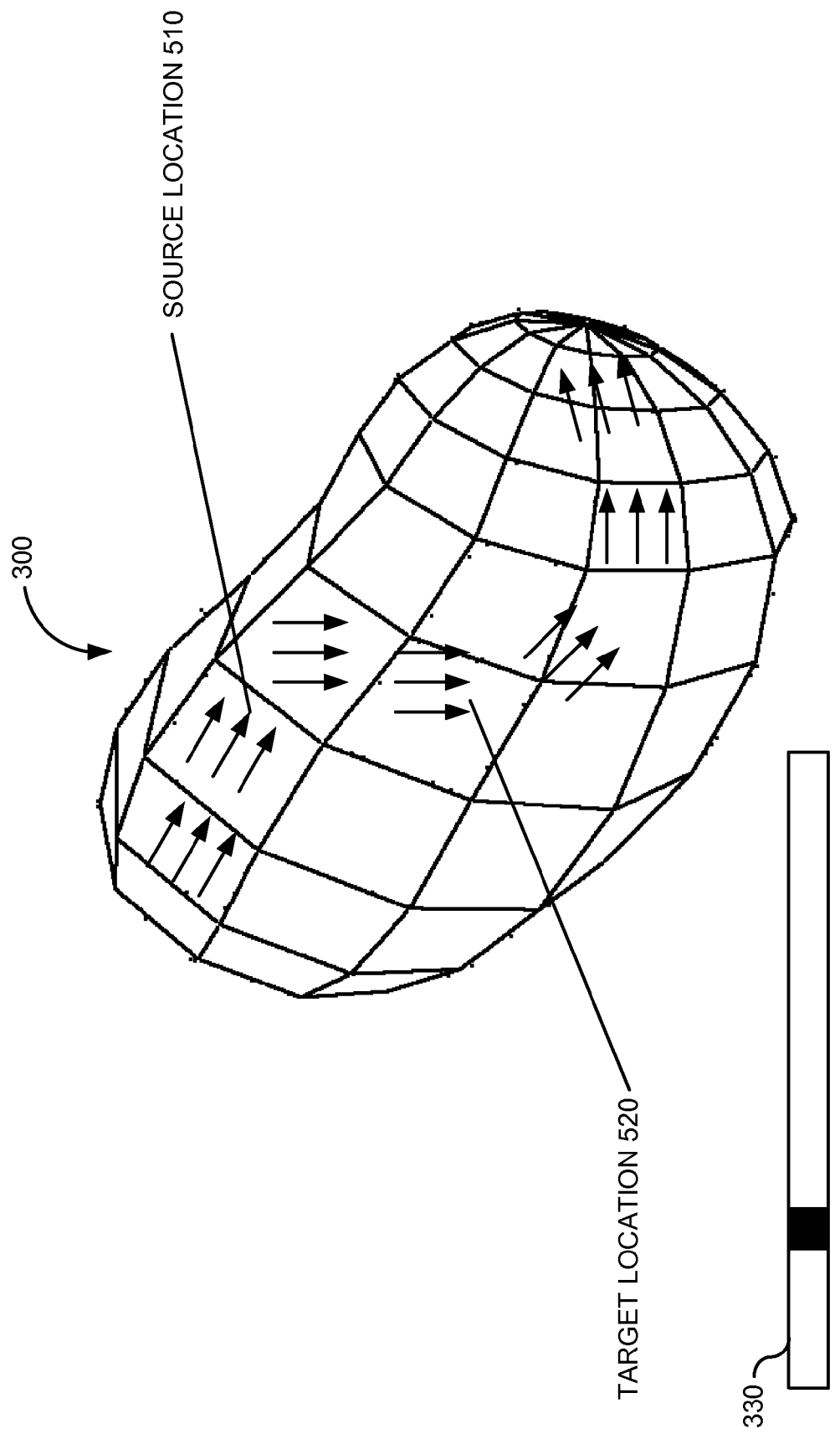
FIG. 5 is an illustration of the object of FIG. 3 depicting effects of a sliding deformer in one embodiment.

FIG. 5 is an illustration of object 300 of FIG. 3 depicting effects of a sliding deformer in one embodiment. In this location, a feature of object 300 indicated by source location 510 or other information defined on or near source location 510 may be transferred along the shape of object 300 to target location 520.

Accordingly, in various aspects, system 100 generates a sliding deformer that allows nondynamic objects, such as representations of skin, to appear to slide on a target surface. System 100 may provide one or more controls (e.g., a slider or a dial) that allow the user to slide the nondynamic objects along shape of the target surface. Other information defined on or near an irregular mesh may be transferred using the sliding deformer.

Figure 6:
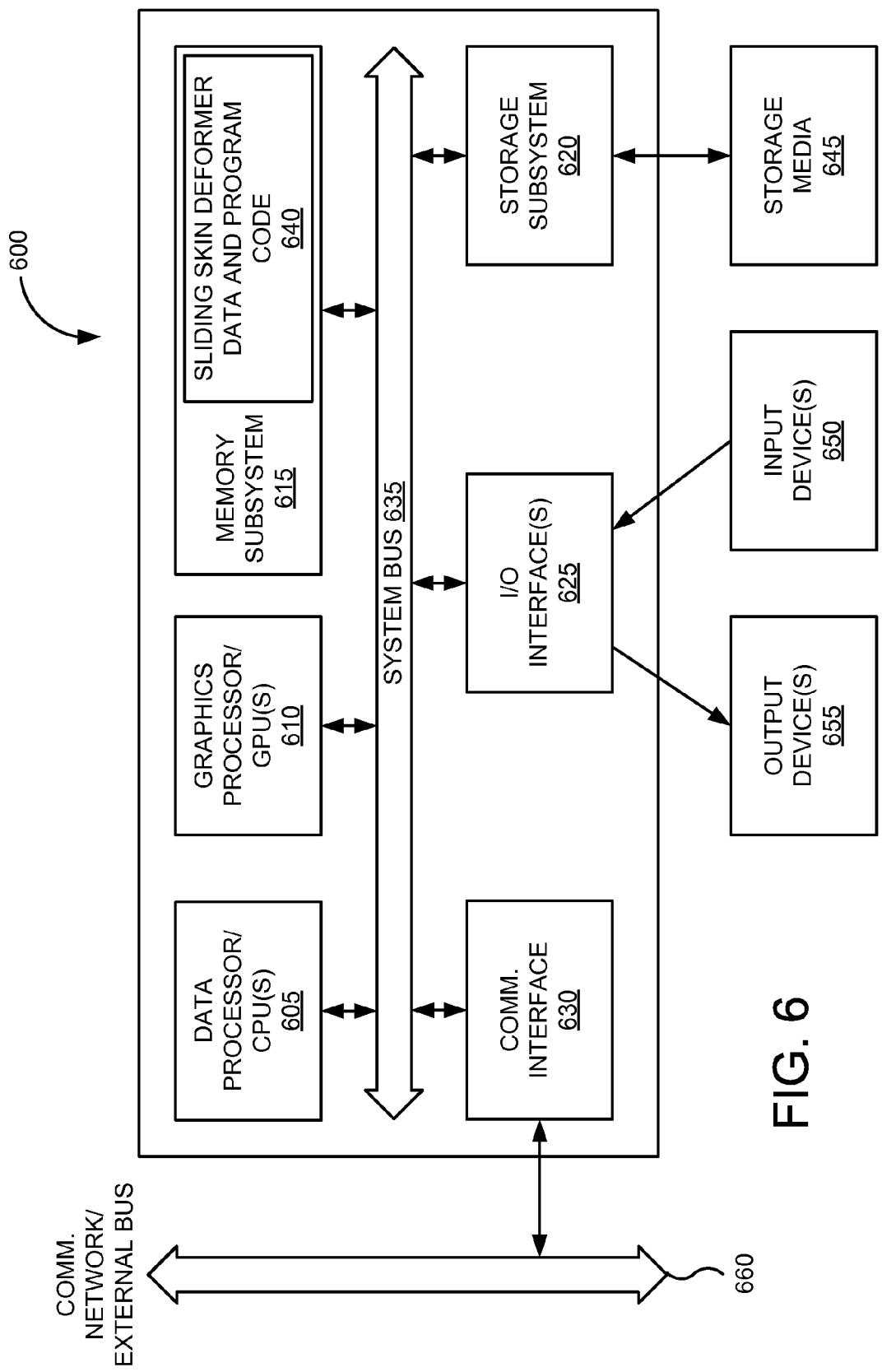
FIG. 6 is a block diagram of a computer system or information processing device that may incorporate an embodiment, be incorporated into an embodiment, or be used to practice any of the innovations, embodiments, and/or examples found within this disclosure.

FIG. 6 is a block diagram of computer system 600 that may incorporate an embodiment, be incorporated into an embodiment, or be used to practice any of the innovations, embodiments, and/or examples found within this disclosure. FIG. 6 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 600 can include hardware and/or software elements configured for performing logic operations and calculations, input/output operations, machine communications, or the like. Computer system 600 may include familiar computer components, such as one or more one or more data processors or central processing units (CPUs) 605, one or more graphics processors or graphical processing units (GPUs) 610, memory subsystem 615, storage subsystem 620, one or more input/output (I/O) interfaces 625, communications interface 630, or the like. Computer system 600 can include system bus 635 interconnecting the above components and providing functionality, such connectivity and inter-device communication. Computer system 600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 605 can include hardware and/or software elements configured for executing logic or program code or for providing application-specific functionality. Some examples of CPU(s) 605 can include one or more microprocessors (e.g., single core and multi-core) or micro-controllers. CPUs 605 may include 4-bit, 8-bit, 12-bit, 16-bit, 32-bit, 64-bit, or the like architectures with similar or divergent internal and external instruction and data designs. CPUs 605 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 605 may also include one or more field-gate programmable arrays (FPGAs), application-specific integrated circuits (ASICs), or other microcontrollers. The one or more data processors or central processing units (CPUs) 605 may include any number of registers, logic units, arithmetic units, caches, memory interfaces, or the like. The one or more data processors or central processing units (CPUs) 605 may further be integrated, irremovably or moveably, into one or more motherboards or daughter boards.

The one or more graphics processor or graphical processing units (GPUs) 610 can include hardware and/or software elements configured for executing logic or program code associated with graphics or for providing graphics-specific functionality. GPUs 610 may include any conventional graphics processing unit, such as those provided by conventional video cards. Some examples of GPUs are commercially available from NVIDIA, ATI, and other vendors. In various embodiments, GPUs 610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 610 may include any number of registers, logic units, arithmetic units, caches, memory interfaces, or the like. The one or more data processors or central processing units (CPUs) 605 may further be integrated, irremovably or moveably, into one or more motherboards or daughter boards that include dedicated video memories, frame buffers, or the like.

Memory subsystem 615 can include hardware and/or software elements configured for storing information. Memory subsystem 615 may store information using machine-readable articles, information storage devices, or computer-readable storage media. Some examples of these articles used by memory subsystem 615 can include random access memories (RAM), read-only-memories (ROMS), volatile memories, nonvolatile memories, and other semiconductor memories. In various embodiments, memory subsystem 615 can include sliding skin deformer data and program code 640.

Storage subsystem 620 can include hardware and/or software elements configured for storing information. Storage subsystem 620 may store information using machine-readable articles, information storage devices, or computer-readable storage media. Storage subsystem 620 may store information using storage media 645. Some examples of storage media 645 used by storage subsystem 620 can include floppy disks, hard disks, optical storage media such as CD-ROMS, DVDs and bar codes, removable storage devices, networked storage devices, or the like. In some embodiments, all or part of sliding skin deformer data and program code 640 may be stored using storage subsystem 620.

In various embodiments, computer system 600 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 600 may also include one or more applications configured to execute, perform, or otherwise implement techniques disclosed herein. These applications may be embodied as sliding skin deformer data and program code 640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 615 and/or storage subsystem 620.

The one or more input/output (I/O) interfaces 625 can include hardware and/or software elements configured for performing I/O operations. One or more input devices 650 and/or one or more output devices 655 may be communicatively coupled to the one or more I/O interfaces 625.

The one or more input devices 650 can include hardware and/or software elements configured for receiving information from one or more sources for computer system 600. Some examples of the one or more input devices 650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 650 may allow a user of computer system 600 to interact with one or more nongraphical or graphical user interfaces to enter a comment, select objects, icons, text, user interface widgets, or other user interface elements that appear on a monitor/display device via a command, a click of a button, or the like.

The one or more output devices 655 can include hardware and/or software elements configured for outputting information to one or more destinations for computer system 600. Some examples of the one or more output devices 655 can include a printer, a fax, a feedback device for a mouse or joystick, external storage systems, a monitor or other display device, a communications interface appropriately configured as a transceiver, or the like. The one or more output devices 655 may allow a user of computer system 600 to view objects, icons, text, user interface widgets, or other user interface elements.

A display device or monitor may be used with computer system 600 and can include hardware and/or software elements configured for displaying information. Some examples include familiar display devices, such as a television monitor, a cathode ray tube (CRT), a liquid crystal display (LCD), or the like.

Communications interface 630 can include hardware and/or software elements configured for performing communications operations, including sending and receiving data. Some examples of communications interface 630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 630 may be coupled to communications network/external bus 660, such as a computer network, to a FireWire bus, a USB hub, or the like. In other embodiments, communications interface 630 may be physically integrated as hardware on a motherboard or daughter board of computer system 600, may be implemented as a software program, or the like, or may be implemented as a combination thereof.

In various embodiments, computer system 600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 600.

As suggested, FIG. 6 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for facilitating computer-generated animation, the method comprising:
receiving, at one or more computer systems, information specifying an irregular mesh;
receiving, at the one or more computer systems, information specifying a weight map indicative of locations associated with the irregular mesh and a value for each indicated location weighting motion at the indicated location of one or more surfaces associated with the irregular mesh;
receiving, at the one or more computer systems, information specifying a direction field independent of the weight map identifying one or more directions at one or more portions of the irregular mesh at which the one or more surfaces are moved along the portions of the irregular mesh;
generating, with one or more processors associated with the one or more computer systems, a sliding deformer for the irregular mesh based on the weight map and the direction field, the sliding deformer configured to constrain motion of the one or more surfaces relative to a predetermined shape of the irregular mesh in a manner consistent with the weight map and the direction field; and
storing, in a storage device associated with the one or more computer systems, the sliding deformer in association with the irregular mesh.

2. The method of claim 1 further comprising:
receiving, at the one or more computer systems, information specifying input to the sliding deformer;
receiving, at the one or more computer systems, a first location relative to the irregular mesh; and
determining, with the one or more processors associated with the one or more computer systems, a second location relative to the irregular mesh with the sliding deformer based on the input to the sliding deformer and the first location relative to the irregular mesh, the second location relative to the irregular mesh being a geodesic distance along the predetermined shape of the irregular mesh from the first location relative to the irregular mesh.

3. The method of claim 1 further comprising:
receiving, at the one or more computer systems, information specifying input to the sliding deformer;
receiving, at the one or more computer systems, a first location associated with the irregular mesh;
receiving, at the one or more computer systems, information associated with the first location, the information being defined on or near the irregular mesh at the first location or defined on or near another mesh at another location corresponding to the first location;
transferring, with the one or more processors associated with the one or more computer systems, the information associated with the first location to a second location associated with the irregular mesh, the second location determined with the sliding deformer to be a geodesic distance along the predetermined shape of the irregular mesh from the first location based on the input to the sliding deformer and the first location associated with the irregular mesh.

4. The method of claim 3 wherein the information associated with the first location comprises at least one of a vertex associated with the irregular mesh, an edge associated with the irregular mesh, a face associated with the irregular mesh, color data associated with the irregular mesh or the another mesh, animation data associated with the irregular mesh or the another mesh, simulation or dynamic properties associated with the irregular mesh or the another mesh, and render data associated with the irregular mesh or the another mesh.

5. The method of claim 1 wherein receiving, at the one or more computer systems, information specifying the weight map comprises receiving at least one of user input and procedural input.

6. The method of claim 1 wherein receiving, at the one or more computer systems, information specifying the direction field comprises receiving at least one of user guidance and procedural guidance.

7. The method of claim 1 further comprising generating, with the one or more processors associated with the one or more computer systems, the direction field based on one or more curves specified within an embedding space associated with the irregular mesh.

8. The method of claim 1 further comprising generating, with the one or more processors associated with the one or more computer systems, the direction field based on rotation about a predetermined axis.

9. The method of claim 1 further comprising generating, with the one or more processors associated with the one or more computer systems, the direction field independently of any influence derived from the irregular mesh.

10. The method of claim 1 further generating, with the one or more processors associated with the one or more computer systems, animation data representing the sliding of skin represented by the irregular mesh with the sliding deformer.

11. A non-transitory computer-readable medium storing computer-executable code for facilitating computer-generated animation, the non-transitory computer-readable medium comprising:
code for receiving information specifying an irregular mesh;
code for receiving information specifying a weight map indicative of locations associated with the irregular mesh and a value for each indicated location weighting motion at the indicated location of one or more surfaces associated with the irregular mesh;
code for receiving information specifying a direction field independent of the weight map identifying one or more directions at one or more portions of the irregular mesh at which the one or more surfaces are moved along the portions of the irregular mesh; and
code for generating a sliding deformer for the irregular mesh based on the weight map and the direction field, the sliding deformer configured to constrain motion of the one or more surfaces relative to a predetermined shape of the irregular mesh in a manner consistent with the weight map and the direction field.

12. The non-transitory computer-readable medium of claim 11 further comprising:
code for receiving information specifying input to the sliding deformer;
code for receiving a first location relative to the irregular mesh; and
code for determining a second location relative to the irregular mesh with the sliding deformer based on the input to the sliding deformer and the first location relative to the irregular mesh, the second location relative to the irregular mesh being a geodesic distance along the predetermined shape of the irregular mesh from the first location relative to the irregular mesh.

13. The non-transitory computer-readable medium of claim 11 further comprising:
code for receiving information specifying input to the sliding deformer;

code for receiving a first location associated with the irregular mesh;

code for receiving information associated with the first location, the information being defined on or near the irregular mesh at the first location or defined on or near another mesh at another location corresponding to the first location;

code for transferring the information associated with the first location to a second location associated with the irregular mesh, the second location determined with the sliding deformer to be a geodesic distance along the predetermined shape of the irregular mesh from the first location based on the input to the sliding deformer and the first location associated with the irregular mesh.

14. The non-transitory computer-readable medium of claim 11 wherein the code for receiving information specifying the weight map comprises receiving at least one of user input and procedural input.

15. The non-transitory computer-readable medium of claim 11 wherein the code for receiving information specifying the direction field comprises receiving at least one of user guidance and procedural guidance.

16. The non-transitory computer-readable medium of claim 11 further comprising code for generating the direction field based on one or more curves specified within an embedding space associated with the irregular mesh.

17. The non-transitory computer-readable medium of claim 11 further comprising code for generating the direction field based on rotation about a predetermined axis.

18. The non-transitory computer-readable medium of claim 11 further comprising code for generating the direction field independently of any influence derived from the irregular mesh.

19. The computer-readable medium of claim 11 further comprising code for generating animation data representing the sliding of skin represented by the irregular mesh with the sliding deformer.

* * * * *